United States Patent [19]
Ohgi et al.

[11] Patent Number: 5,657,936
[45] Date of Patent: Aug. 19, 1997

[54] TAPE REEL POSITION RESTRICTING ASSEMBLY FOR TAPE CASSETTE

[75] Inventors: Takashi Ohgi; Osamu Taguchi, both of Miyagi, Japan

[73] Assignee: Sony Corporation, Tokyo, Japan

[21] Appl. No.: 550,706

[22] Filed: Oct. 31, 1995

[30] Foreign Application Priority Data

Nov. 2, 1994 [JP] Japan .................................. 6-269413
Feb. 16, 1995 [JP] Japan .................................. 7-027975

[51] Int. Cl.$^6$ .............................. G11B 23/087; G11B 23/04
[52] U.S. Cl. ............................ 242/344; 242/345; 242/346; 242/347; 360/132
[58] Field of Search .................................. 242/344, 345, 242/346, 347; 360/132

[56] References Cited

U.S. PATENT DOCUMENTS

| 4,916,566 | 4/1990 | Urayama | 242/345 |
| 5,024,394 | 6/1991 | Ozawa et al. | 360/132 X |
| 5,330,128 | 7/1994 | Li et al. | 242/345.2 |

FOREIGN PATENT DOCUMENTS

| A0110266 | 6/1984 | European Pat. Off. . |
| A0397436 | 11/1990 | European Pat. Off. . |
| A4344917 | 7/1994 | Germany . |
| A3409726 | 10/1994 | Germany . |
| A2269807 | 2/1994 | United Kingdom . |

Primary Examiner—John Q. Nguyen
Attorney, Agent, or Firm—William S. Frommer; Alvin Sinderbrand

[57] ABSTRACT

A tape cassette includes tape reels and a cassette main body formed of an upper shell and a lower shell. In such a tape cassette, a tape reel position restricting portion serving as a reinforcing member for the lower shell is provided on the lower shell at a position outside an outer periphery of the lower flange. The tape reel position restricting portion includes a high rib; an intermediate rib being lower than the high rib within a range not to obstruct passing of a tape end detecting light beam, and being positioned in a tape end detecting light path; and a low rib being lower than the intermediate rib, and being positioned in a tape path region. The intermediate rib and the low rib are preferably disposed outside the high rib.

12 Claims, 5 Drawing Sheets

TAPE REEL POSITION RESTRICTING ASSEMBLY FOR TAPE CASSETTE

BACKGROUND OF THE INVENTION

1. Field of the Invention

The present invention relates to a tape cassette, and particularly to a tape cassette including a tape reel position restricting member serving as a reinforcing member for a lower shell of the tape cassette.

2. Description of the Related Art

A tape cassette used for a recording/reproducing apparatus for recording/reproducing a data signal, a video signal or the like, has a magnetic tape wound around a pair of tape reels. Specifically, a magnetic tape is wound around a pair of tape reels with flanges by specified turns in the state that both the ends thereof are each fixed to both the tape reels, and it is rotatably contained in a cassette main body.

The magnetic tape thus wound around a pair of the tape reels runs from one tape reel to the other tape reel by way of an opening portion provided in the front surface side of the tape cassette.

In such a tape cassette, it is undesirable that a pair of the tape reels are largely moved in the cassette main body. To prevent the large movement of each tape reel, a restricting rib is provided in such a manner as to substantially surround the tape reel for restricting the movement of the tape reel within a specified range not to obstruct the rotation of the tape reel.

The restricting rib has a height being substantially the same as that of the tape cassette.

Incidentally, the magnetic tape used for such a tape cassette has transparent regions at both the end portions thereof. When the tape cassette is loaded in a recording/reproducing apparatus, a light beam emitted from a tape end detecting light source passes through the interior of the tape cassette. The end portion of the tape is detected when the light beam transmits the transparent region at the end portion of the tape.

Recently, to meet a requirement for miniaturization of a recording/reproducing apparatus, a tape cassette generally has come to be reduced in size and weight. As a result, it has become important in design to keep the strength and the accuracy of the tape cassette thus reduced in size and weight. The above attempt to keep the strength and accuracy of the tape cassette reduced in size and weight has been also required to be achieved in such a manner as not to obstruct a light path from the tape end detecting light source.

SUMMARY OF THE INVENTION

An object of the present invention is to provide a tape cassette including a tape reel position restricting member serving as a reinforcing member for a lower shell of the tape cassette.

To achieve the above object, according to a preferred mode of the present invention, there is provided a tape cassette comprising:

a pair of tape reels, each including a hub portion wound with a tape; and an upper flange and a lower flange each of which is formed in a disk-like shape and is larger in diameter than the hub portion, the upper and lower flanges being each provided on upper and lower end surfaces of the hub portion; and a cassette main body which is formed of an upper shell and a lower shell, and which contains a pair of the tape reels wound with the tape therein;

the improvement wherein tape reel position restricting portions serving as reinforcing members for the lower shell are each provided on the lower shell at positions outside outer peripheries of the lower flanges of a pair of the tape reels, each of the tape reel position restricting portions including:

a high rib;

an intermediate rib being lower than the high rib within a range not to obstruct passing of a tape end detecting light beam, and being positioned in a tape end detecting light path; and a low rib being lower than the intermediate rib, and being positioned in a tape path region.

In such a tape cassette, the low rib, the intermediate rib, and the high rib may be disposed substantially on the same circumference. The height of the low rib may be substantially the same as that of each of tape height restricting ribs which are provided continuously to base portions of tape guides positioned on right and left sides of an opening portion formed in a front surface side of the cassette. A tape reel position correcting portion may be provided on the inner surface of at least either the low rib or the intermediate rib. Part of the high rib may be provided continuously to a side wall of the lower shell. The height of the high rib may be the same as that of a side wall of the lower shell.

According to another preferred mode of the present invention, in the tape cassette described in the above-described preferred mode of the present invention, the intermediate rib and the low rib are disposed outside the high rib.

In such a tape cassette, the height of the low rib may be substantially the same as that of each of tape height restricting ribs which are provided continuously to base portions of tape guides positioned on right and left sides of an opening portion formed in a front surface side of the cassette. A tape reel position correcting portion may be provided on the inner surface of at least either the low rib or the intermediate rib. Part of the high rib may be provided continuously to a side wall of the lower shell.

The above and other features and advantages of the present invention will become apparent from the following description which will be given with reference to the illustrative accompanying drawings.

DETAILED DESCRIPTION OF THE PREFERRED EMBODIMENT

Hereinafter, an embodiment of a tape cassette according to the present invention will be described with reference to the accompanying drawings.

Figure 1:
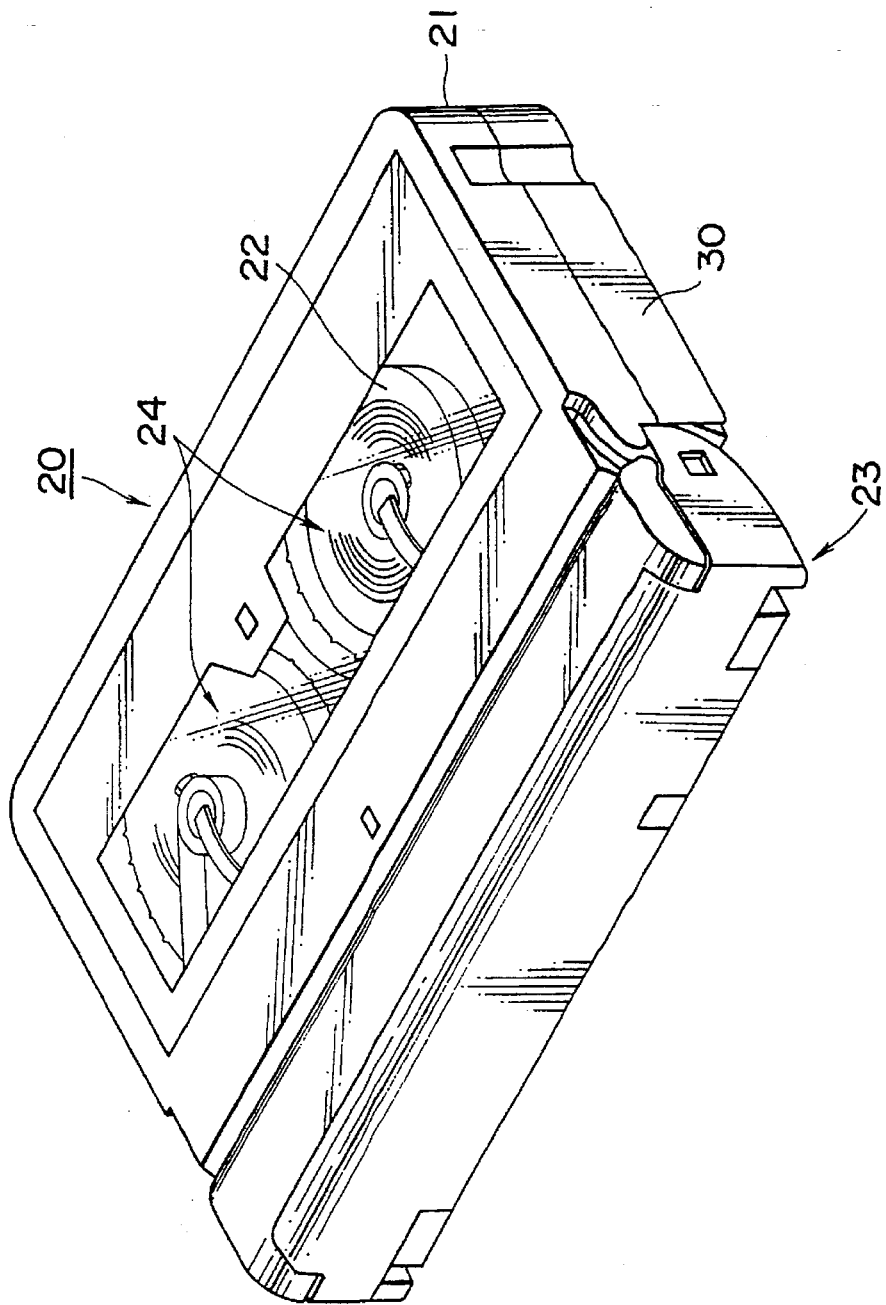
FIG. 1 is a perspective view showing the entire configuration of a tape cassette with a lid according to the present invention.

A tape cassette 20 with a lid for recording/reproducing is formed in a rectangular parallelepiped shape, as shown in FIG. 1. The tape cassette 20 has an upper shell 21; a lid mechanism 23; a pair of tape reels 24, 24 wound with a recording/reproducing tape 22; and a lower shell 30. The lid mechanism 23 is turnable to expose part of the tape 22 to the exterior when the cassette 20 is used and to cover the tape 22 while holding both the surfaces thereof when the cassette 20 is not used.

Figure 2:
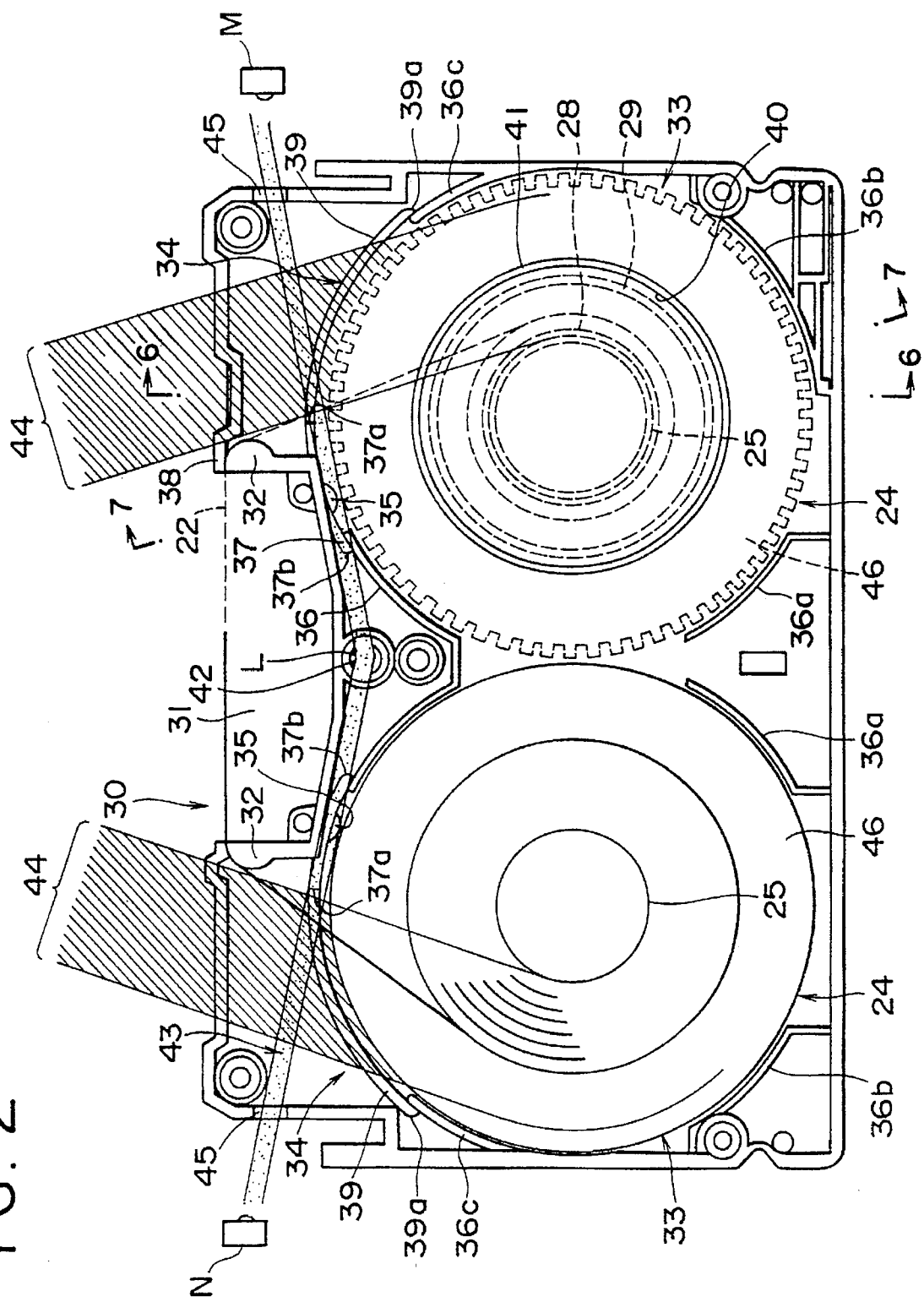
FIG. 2 is a plan view of the tape cassette of FIG. 1 showing the state that tape reels are mounted in a lower shell.
Figure 6:
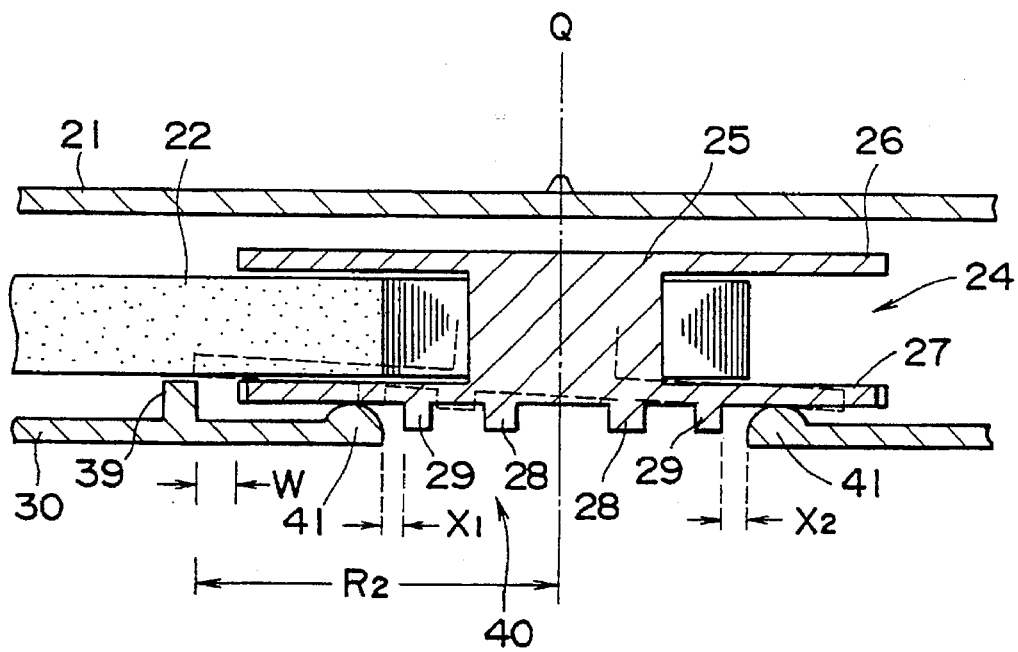
FIG. 6 is a schematic sectional view taken on line A—A of FIG. 2 illustrating a relationship between the lower shell reinforcing ribs and the tape reel.
Figure 7:
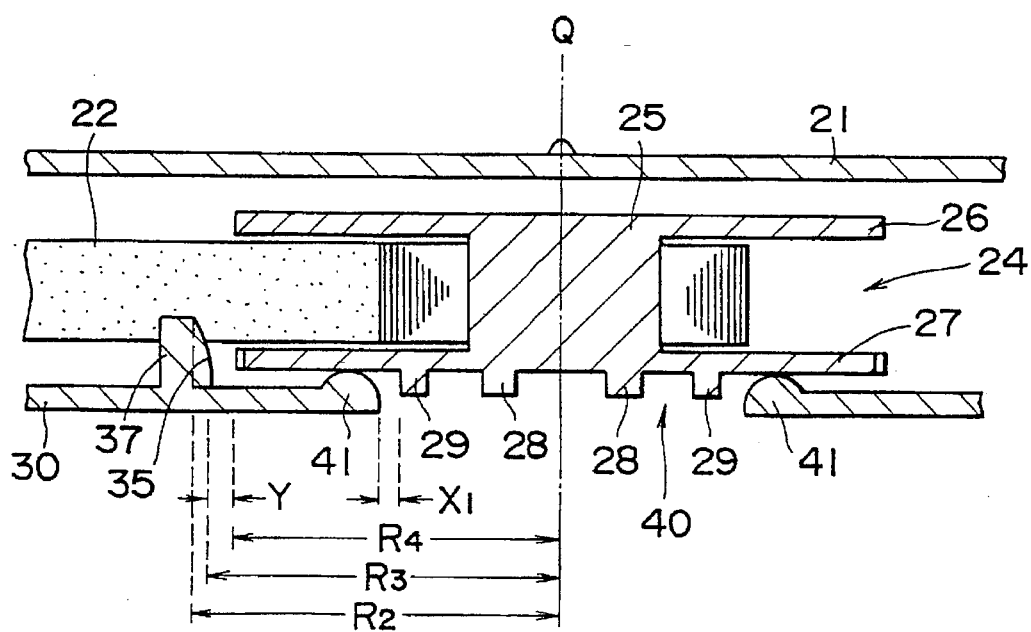
FIG. 7 is a schematic sectional view taken on line B—B of FIG. 2 illustrating another relationship between the lower shell reinforcing ribs and the tape reel.

Referring to FIG. 2 and FIGS. 6, 7, the tape reel 24 has a circular reel hub 25 provided at the center thereof, and upper and lower flanges 26, 27 disposed in such a manner as to put the reel hub 25 therebetween in the vertical direction. The reel hub 25 of the tape reel 24 is rotated by an external drive mechanism positioned under the reel hub 25. The tape 22 is wound around both the reel hubs 25.

On the back surface of the lower flange 27, a hub projecting portion 28 formed in an annular shape having a specified width is provided at a position adjusted to the outer periphery of each reel hub 25, and outside the hub projecting portion 28, a reel guide projecting portion 29 formed in an annular shape having a specified width is provided. The reel guide projecting portion 29 has an outside diameter smaller than the inside diameter of a reel drive hole 40 (described later) of the lower shell 30.

Referring to FIG. 2, the lower shell 30 which is to be engaged with the upper shell 21, is formed in an approximately rectangular parallelepiped shape. The front surface side of the lower shell 30 has an opening portion 31; tape guides 32, 32 disposed at the right and left ends of the opening portion 31; and reel mounting portions 33, 33. The opening portion 31 functions such that when the cassette 20 is loaded in a recording/reproducing apparatus, the lid mechanism is opened and part of the tape 22 is exteriorly exposed through the opening portion 31. The tape guides 32, 32 act to guide the tape 22 and to expose the tape 22 to the exterior. The reel mounting portions 33, 33 for mounting the right and left reels 24, 24 are provided at right and left symmetric positions relative to the opening portion 31.

To achieve smooth positioning of the tape reel 24, the reel mounting portion 33 has a rib 34 provided along the outer periphery of the reel 24 in such a manner as to partially serve as the side wall of the lower shell 30; a droplet-shaped position restricting projection 35 provided at a suitable position of the rib 34; and the above-described reel drive hole 40 formed to be rotatably engaged with the reel 24. The rib 34 serves as a reinforcing member for the cassette 20.

Incidentally, in the tape cassette of the present invention, the end portion of the tape 22 can be optically detected. As shown in FIG. 2, a light source hole 42 is formed in an approximately central portion of the lower shell 30. A tape end detecting light source L provided on a recording/reproducing apparatus is inserted in the light source hole 42. A light beam emitted from the light source L passes through a light path 43, and transmits a transparent portion formed at each end portion of the tape 22. The light beam then passes through a light path opening portion 45 provided on each side surface of the lower shell 30, and reaches a detector M or N. The recording/reproducing apparatus thus detects the end portion of the tape 22, and on the basis of the detected result, it controls running of the tape 22.

Figure 3:
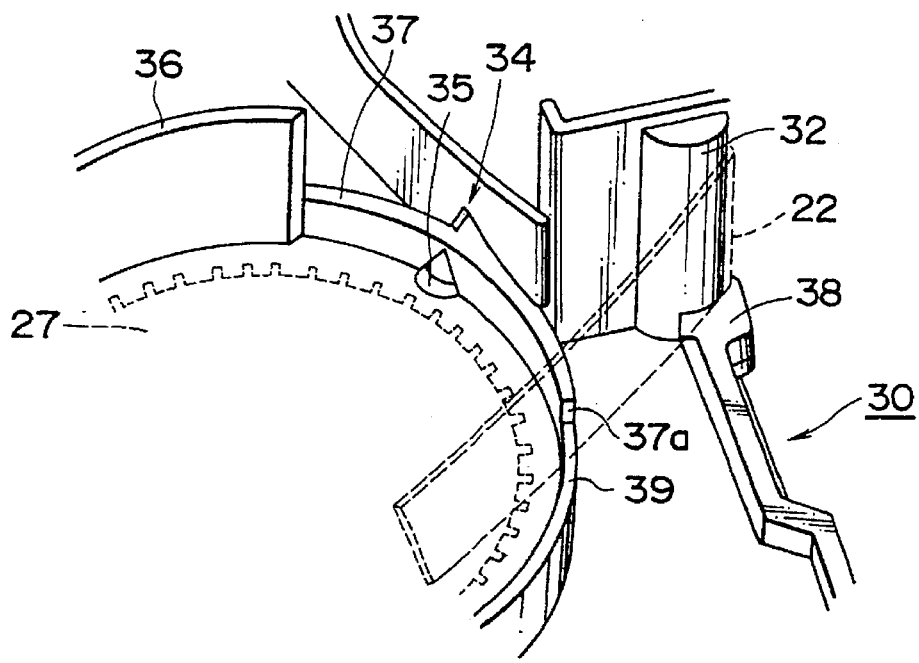
FIG. 3 is an enlarged sectional view of essential portions of reinforcing ribs used for the tape cassette shown in FIG. 1.

Referring to FIGS. 2 and 3, the rib 34 includes high ribs 36, 36a, 36b and 36c; an intermediate rib 37; and a low rib 39. Each of the high ribs 36, 36a, 36b and 36c, having a height being substantially the same as that of the reel 24, is adapted to guide the outer periphery of the reel 24. The intermediate rib 37 extends from the high rib 36 to the entrance side of the tape 22 in such a manner as to lie on a circumference positioned outwardly from the high rib 36 by a distance nearly equal to the width of the high rib 36. The height of the intermediate rib 37 is substantially half that of the high rib 36. The low rib 39 extends from the intermediate rib 37 on the same circumference. However, the low rib 39 located at a position corresponding to the entrance of the tape 22 is made lower than the intermediate rib 37. Specifically, the low rib 39 is partitioned from the intermediate rib 37 by a stepped portion 37a. The height of the low rib 39 is equivalent to that of a tape position restricting rib 38 provided on the base side of the tape guide 32 so as to serve as the side wall of the lower shell 30.

Recently, to meet a requirement for miniaturization of a recording/reproducing apparatus, a tape cassette has come to be reduced in size and weight. Consequently, shells of the tape cassette have been thinned, and thereby the tape cassette has been reduced in strength and accuracy. To compensate for the reduced strength and accuracy, it is important to provide ribs as reinforcing members in the tape cassette. Specifically, for ensuring the strength and accuracy of the tape cassette, the number of the ribs (for example, the ribs 36, 36a, 36b, 36c) provided so as to surround the outer periphery of the tape reel 24 is required to be increased as much as possible.

However, any rib cannot be provided at such a portion as to obstruct a running path 44 of the tape 22 or the light path 43 from the tape end detecting light source L, and in the case where any rib is not provided, such a portion cannot be ensured in strength.

To cope with such an inconvenience, the intermediate rib 37 having a height being lower than the high ribs 36, 36a, 36b, 36c within a range not to obstruct the light path 43 is provided extending from an end portion 37b to the stepped portion 37a. Moreover, the low rib 39 having a height being lower than the intermediate rib 37 within a range not to obstruct the running of the tape 22 is provided extending from the stepped portion 37a to an end portion 39a. With this configuration, since the ribs each being increased in height within a range not to obstruct the tape running path 44 or the light path 43 are provided, the tape cassette can be effectively reinforced by the reinforcing ribs.

Figure 4:
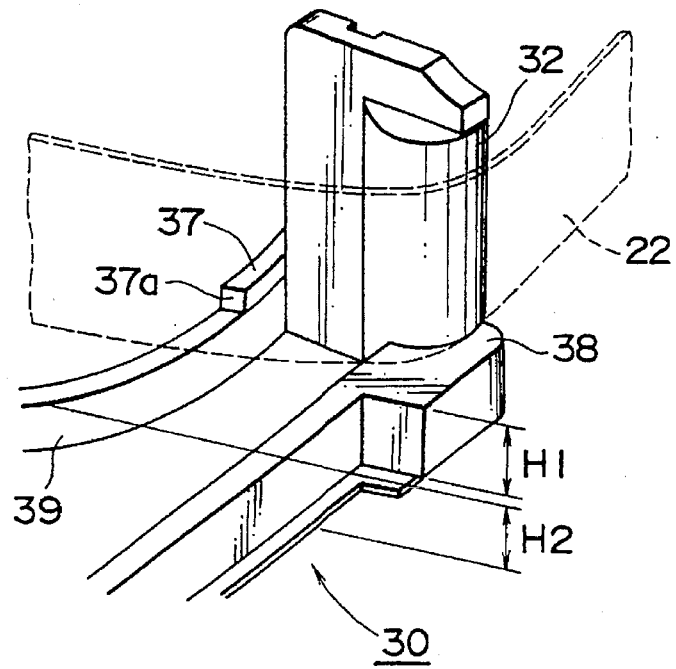
FIG. 4 is a perspective view of essential portions of reinforcing ribs illustrating a relationship between a low rib and a tape position restricting rib.

Referring to FIG. 4, the height H1 of the low rib 39 on the basis of the outer bottom surface of the lower shell is set to be equal to the height H2 of the position restricting rib 38 on the basis of the outer bottom surface of the lower shell (H1=H2).

The position restricting projection 35 is provided in the vicinity of the entrance of the tape 22, as shown in FIGS. 2 and 3. This is formed in such a droplet shape as to be spread downward from the top surface of the rib (intermediate rib 37 in this embodiment), and has such a size as not to be brought in contact with the peripheral edge of the lower flange 27 of the reel 24 when the reel guide projecting portion 29 is fitted in the reel drive hole 40 (see FIG. 7).

On the other hand, as shown in FIG. 2 and FIGS. 6, 7, the reel drive hole 40 rotatably engaged with the reel 24 has a size allowing the reel guide projecting portion 29 of the lower flange 27 of the tape reel 24 to be loosely fitted therein. A reel positioning rib 41 having a taper surface tapered upward from the peripheral edge surface is provided around the peripheral edge of the reel drive hole 40.

Figure 5:
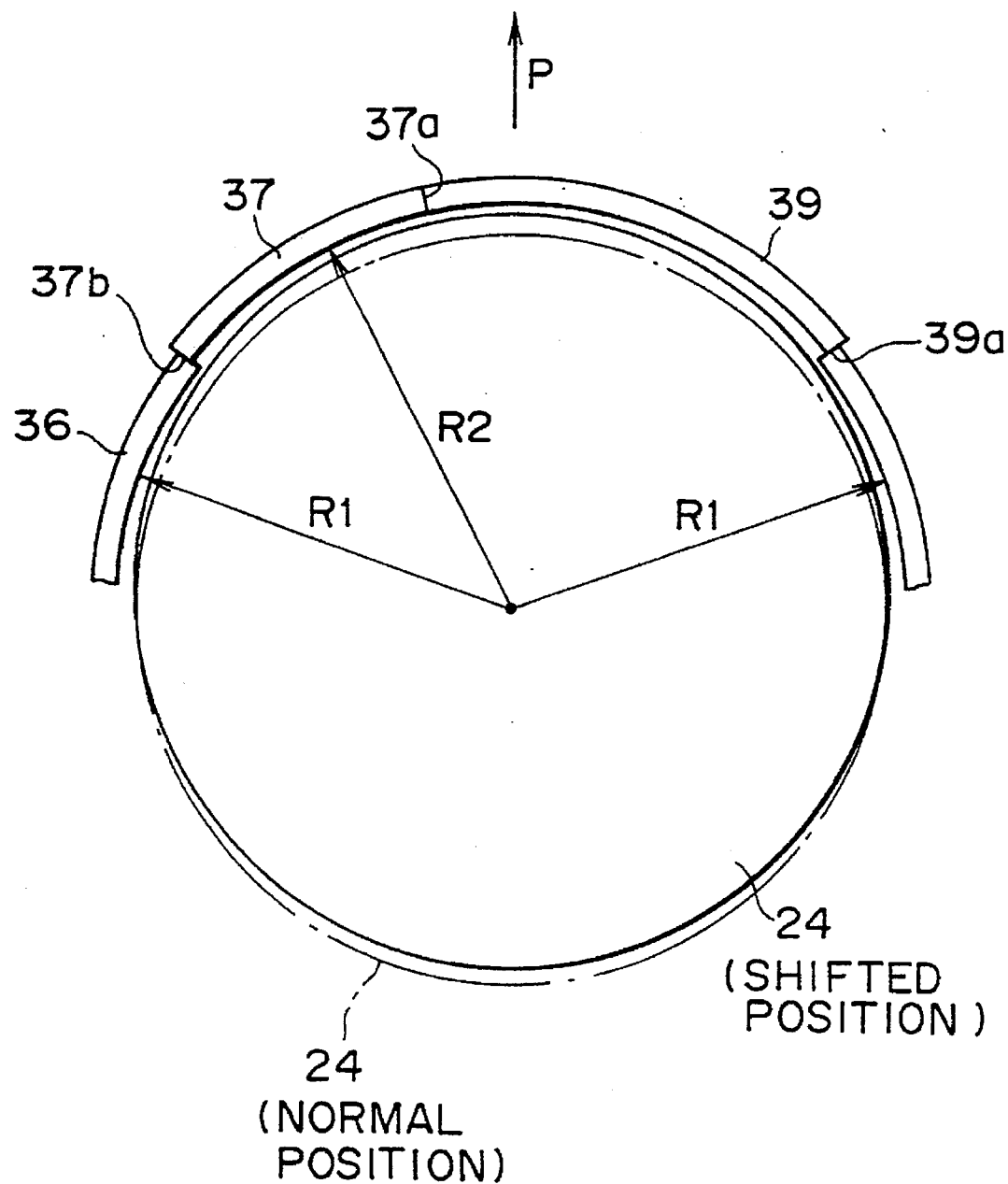
FIG. 5 is a schematic view illustrating a relationship between the reinforcing ribs and the tape reel.

The positional relationship between the ribs 36, 37, 39 provided on the lower shell 30 and the reel 24 is as shown in FIGS. 5, 6. The low rib 39 and the intermediate rib 37 lie on a circle having a diameter R2 from a center Q of the reel drive hole 40, and the high rib 36 lies on a circle having a diameter R1 from the center Q. The diameter R2 is larger than the diameter R1(R1<R2).

As shown in FIG. 7, the positional relationship among the position restricting projection 35 formed on the lower shell 30, the reel 24, and the low rib 39 is represented by the equation of R4<R3<R2, wherein R3 is a diameter of the position restricting projection from the center Q of the reel drive hole 40; R4 is a diameter of the peripheral edge of the lower flange 27 of the reel 24 from the center Q; and R2 is a diameter of the low rib 39 from the center Q.

As shown in FIG. 7, letting Y be an interval between the position restricting projection 35 provided at a position of the intermediate rib 37 and the peripheral edge of the lower flange 27, and also letting X1 be an interval between the reel positioning rib 41 and the reel guide projecting portion 29, the equation of Y≧X1 is given. With this positional relationship, if the reel 24 is moved toward the low rib 39 due to impact or the like and rides on the reel positioning rib 41, it can be pressed back by the side surface of the droplet shape of the position restricting projection 35. And, if the reel 24 is forced to further ride on the reel positioning rib 41, it does not ride on the low rib 39 and is pressed back because the peripheral edge of the lower flange 27 is separated apart from the low rib 39.

Even if the upper and lower shells 21, 30 are instantly swelled outward due to impact caused by drop of the tape cassette 30 or the like and the tape reel 20 itself is moved toward the low rib 39, the riding of the reel 24 on the low rib 39 can be prevented. Thus, it is possible to prevent a failure in rotation upon insertion of the tape cassette in a recording/reproducing apparatus such as a video tape recorder.

As described above, according to the tape cassette of the present invention, a tape reel position restricting member including high ribs, an intermediate rib and a low rib is provided in such a manner as to surround the outer periphery of each tape reel. The low rib on the entrance side of the tape is positioned outward from the high ribs and the intermediate rib. With this configuration, even if the tape reel is shifted from a specified position due to external factors such as impact caused by drop or internal factors such as an abnormal tension of the tape, the peripheral edge of the reel is prevented from easily riding on the low rib. As a result, it becomes possible to prevent the damage of the tape due to a failure in rotation generated when the reels are not satisfactorily fitted in reel supports upon insertion of the cassette in a recording/reproducing apparatus such as a video tape recorder.

According to the tape cassette of the present invention, a projecting portion for restricting the position of the reel is provided at a position on the inner side of the high rib. Accordingly, when the tape reel is shifted in position, it can be returned to the original position before the leading edge surface of the lower flange rides on the low rib, and thereby, even if the cassette is applied with an impact from the exterior, it can be prevented from suffering from a failure in rotation.

According to the tape cassette of the present invention, the height of the low rib on the basis of the outer bottom surface of the lower shell is the same as that of the tape position restricting rib provided on the guide rib on the basis of the outer bottom surface of the lower shell, and accordingly, the lower end of the tape can be stably guided by both the low rib and the tape position restricting rib. For example, during transportation of the cassette, the lower end of the tape can be prevented from being damaged.

While the preferred embodiment of the present invention has been described using specific terms, such description is for illustrative purposes only, and it is to be understood that changes and variations may be made without departing from the spirit or scope of the following claims.

What is claimed is:

1. In a tape cassette comprising:
   a pair of tape reels, each including a hub portion wound with a tape; and an upper flange and a lower flange each of which is formed in a disk-like shape and is larger in diameter than said hub portion, said upper and lower flanges being each provided on upper and lower end surfaces of said hub portion; and
   a cassette main body which is formed of an upper shell and a lower shell, and which contains a pair of said tape reels wound with the tape therein;
   the improvement wherein
   tape reel position restricting portions serving as reinforcing members for said lower shell are each provided on said lower shell at positions outside outer peripheries of said lower flanges of a pair of said tape reels,
   each of said tape reel position restricting portions including:
   a high rib;
   an intermediate rib extending from said high rib and having a height lower than said high rib within a range not to obstruct passing of a tape end detecting light beam, and being positioned in a tape end detecting light path; and
   a low rib extending from said intermediate rib and having a height lower than said intermediate rib, and being positioned in a tape path region.

2. A tape cassette according to claim 1, wherein said low rib and said intermediate rib are disposed substantially on the same circumference.

3. A tape cassette according to claim 2, and further including an opening portion formed in a front surface side of the cassette for exposing exteriorly from the cassette main body a portion of the tape with a pair of tape guides disposed at ends of said opening portion to guide the tape and expose the tape to the exterior, said tape guides including tape height restricting ribs provided continuously along a base portion thereof, wherein the height of said low rib is substantially the same as that of each of said tape height restricting ribs.

4. A tape cassette according to claim 2, wherein a tape reel position correcting portion is provided on a inner surface of at least either said low rib or said intermediate rib.

5. A tape cassette according to any of claim 2, wherein part of said high rib is provided continuously to a side wall of said lower shell.

6. A tape cassette according to claim 1, wherein said intermediate rib and said low rib lie on a circumference which is disposed outwardly from the circumference of said high rib.

7. A tape cassette according to claim 6, and further including an opening portion formed in a front surface side of the cassette for exposing exteriorly from the cassette main body a portion of the tape with a pair of tape guides disposed at ends of said opening portion to guide the tape and expose the tape to the exterior, said tape guides including tape height restricting ribs provided continuously along a base portion thereof, wherein the height of said low rib is substantially the same as that of each of said tape height restricting ribs.

8. A tape cassette according to claim 6, wherein a tape reel position correcting portion is provided on the inner surface of at least either said low rib or said intermediate rib.

9. A tape cassette according to any of claim 6, wherein part of said high rib is provided continuously to a side wall of said lower shell.

10. A tape cassette according to claim 1, wherein the height of said high rib is the same as that of a side wall of said lower shell.

11. In a tape cassette comprising:

a pair of tape reels, each including a hub portion wound with a tape; and an upper flange and a lower flange each of which is formed in a disk-like shape and is larger in diameter than said hub portion, said upper and lower flanges being provided on upper and lower end surfaces of said hub portion;

a cassette main body which is formed of an upper shell and a lower shell, and which contains a pair of said tape reels wound with the tape therein; and an opening portion formed in a front surface of the cassette for exposing exteriorly from the cassette main body a portion of the tape with a pair of tape guides disposed at ends of said opening portion to guide the tape and expose the tape to the exterior, said tape guides including tape height restricting ribs provided continuously along a base portion thereof;

the improvement wherein tape reel position restricting portions serving as reinforcing members for said lower shell are each provided on said lower shell at positions outside outer peripheries of said lower flanges of a pair of said tape reels, each of said tape reel position restricting portions including:

a high rib;

an intermediate rib having a height lower than said high rib within a range not to obstruct passing of a tape end detecting light beam, and being positioned in a tape end detecting light path; and a low rib having a height lower than said intermediate rib, and being positioned in a tape path region, wherein said low rib and said intermediate rib are disposed substantially on the same circumference, and wherein the height of said low rib is substantially the same as that of each of said tape height restricting ribs.

12. In a tape cassette comprising:

a pair of tape reels, each including a hub portion wound with a tape; and an upper flange and a lower flange each of which is formed in a disk-like shape and is larger in diameter than said hub portion, said upper and lower flanges being each provided on upper and lower ends surfaces of said hub portion;

a cassette main body which is formed of an upper shell and a lower shell, and which contains a pair of said tape reels would with the tape therein; and an opening portion formed in a front surface of the cassette for exposing exteriorly from the cassette main body a portion of the tape with a pair of tape guides disposed at ends of said opening portion to guide the tape and expose the tape to the exterior, said tape guides including tape height restricting ribs provided continuously along a base portion thereof;

the improvement wherein tape reel position restricting portions serving as reinforcing members for said lower shell are each provided on said lower shell at positions outside outer peripheries of said lower flanges of a pair of said tape reels, each of said tape reel position restricting portions including:

a high rib;

an intermediate rib having a height lower than said high rib within a range not to obstruct passing of a tape end detecting light beam, and being positioned in a tape end detecting light path; and a low rib having a height lower than said intermediate rib, and being positioned in a tape path region;

wherein said intermediate rib and said low rib lie on a circumference which is disposed outwardly from the circumference of said high rib and wherein the height of said low rib is substantially the same as that of each of said tape height restricting ribs.

* * * * *